Figure 1:
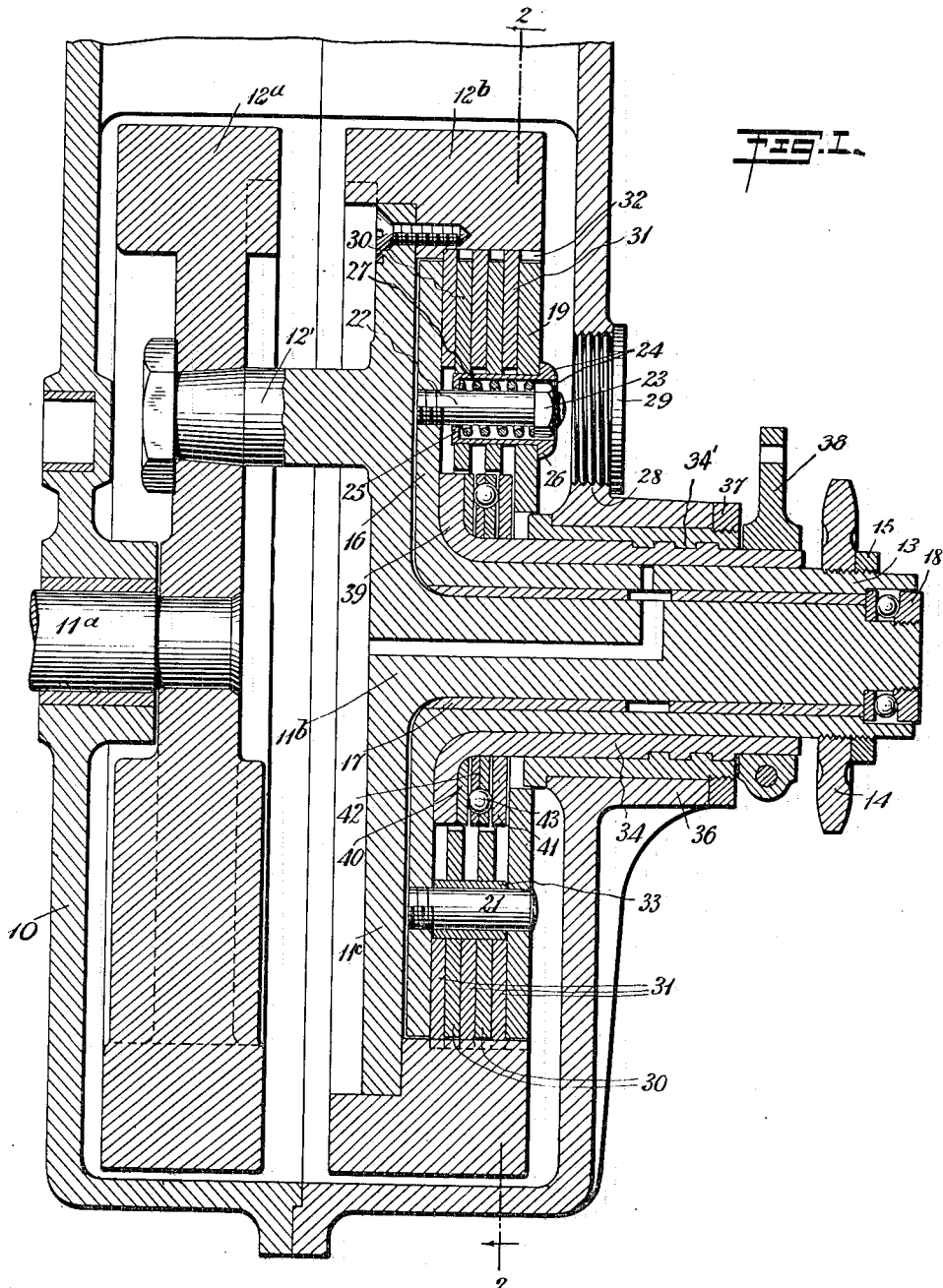

O. G. DE WALD.
DRIVING MECHANISM FOR MOTOR CYCLES.
APPLICATION FILED NOV. 1, 1913.

1,121,172.

Patented Dec. 15, 1914.
2 SHEETS—SHEET 1.

WITNESSES

INVENTOR
Otto G. DeWald
BY
ATTORNEYS

O. G. DE WALD.
DRIVING MECHANISM FOR MOTOR CYCLES.
APPLICATION FILED NOV. 1, 1913.

1,121,172.

Patented Dec. 15, 1914.
2 SHEETS—SHEET 2.

WITNESSES
G. Robert Thomas
Geo. L. Beeler

INVENTOR
Otto G. DeWald
BY
ATTORNEYS

UNITED STATES PATENT OFFICE.

OTTO G. DE WALD, OF NEW YORK, N. Y.

DRIVING MECHANISM FOR MOTOR-CYCLES.

1,121,172.  Specification of Letters Patent.  Patented Dec. 15, 1914.

Application filed November 1, 1913. Serial No. 798,667.

*To all whom it may concern:*

Be it known that I, OTTO G. DE WALD, a citizen of the United States, and a resident of the city of New York, borough of Brooklyn, in the county of Kings and State of New York, have invented a new and Improved Driving Mechanism for Motor-Cycles, of which the following is a full, clear, and exact description.

This invention relates to driving or transmission mechanism for motorcycles, automobiles or other classes of machinery.

Among the objects of the invention is to provide a novel and compact construction of combination fly wheel and friction clutch arranged within a crank casing and possessing a number of specific valuable features of advantage because of such construction and arrangement.

The foregoing and other objects of the invention will hereinafter be more fully described and claimed and illustrated in the drawings forming a part of this specification in which like characters of reference indicate corresponding parts in all the views, and in which—

Figure 2:
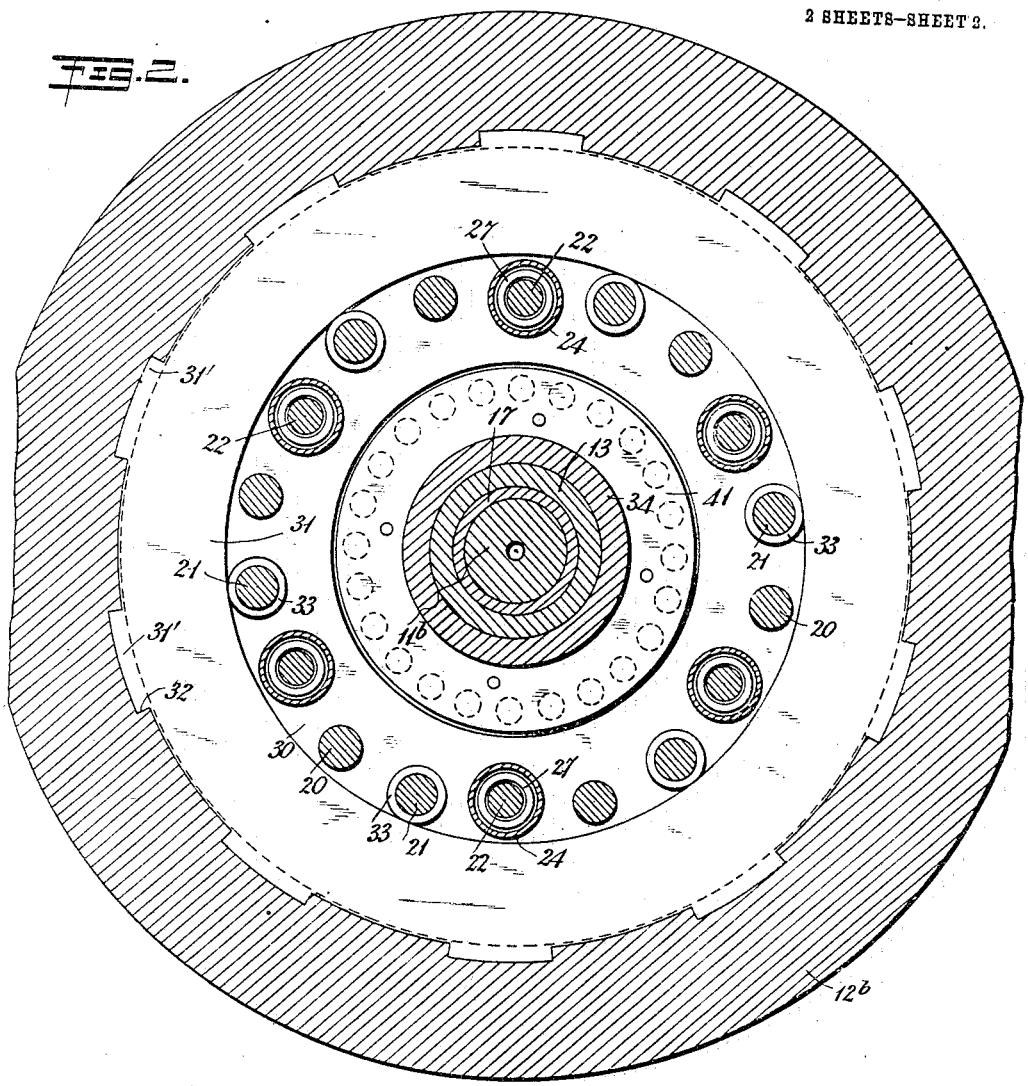
Figure 3:
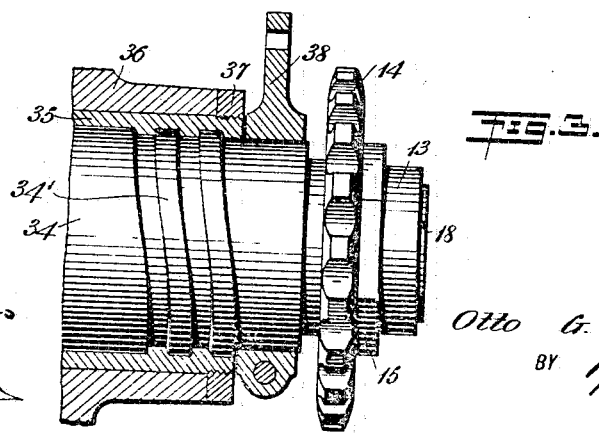

Figure 1 is a vertical section through a crank casing and parts associated therewith; Fig. 2 is a vertical section transverse to Fig. 1 and substantially on the line 2—2; and Fig. 3 is a detail of the controlling means for the clutch.

The several parts of the device may be made of any suitable materials, and the relative sizes and proportions, as well as the general design of the mechanism, may be varied to a considerable extent without departing from the spirit of the invention hereinafter more fully described and specifically claimed.

By way of illustration of a practical and preferred embodiment of this invention I show at 10 a substantially closed casing in which is journaled a two-part crank shaft $11^a$ and $11^b$, to which are connected two parts $12^a$ and $12^b$ of a fly wheel, a wrist pin 12′ constituting the direct connection between said fly wheel parts. The space between the fly wheel parts is adapted to accommodate the usual engine connecting rod (not shown).

The fly wheel is constructed in such a manner as to have direct driving connection with a power sleeve 13 having at one end a driving wheel 14 shown as a sprocket wheel, said wheel being connected to the end of the shaft and there secured by means of a lock nut 15. The other end of the sleeve is formed integral with or has connected thereto in any substantial manner a disk-like flange or plate 16 lying within the rim of the fly-wheel 12 and parallel to the disk $11^c$ connected to or forming a part of the shaft element $11^b$. The sleeve 13 and the crank shaft are arranged coaxially and adapted for relative rotation. Any suitable antifriction means may be arranged between them but for this purpose I show a composition bushing 17. Said sleeve and bushing are held from outward displacement on the shaft by antifriction thrust bearing members 18.

At 19 I show what may be termed a compression plate arranged within the casing 10 and at spaced parallel relation to the plate 16 of the power sleeve. Said plates 16 and 19 are connected for simultaneous rotation around the axis of the shaft by any suitable number or arrangement of studs 20 and 21 of which I show six of each. Said studs are tapped into the plate 16 and have loose slidable engagement at their other ends with the plate 19. In other words, the plate 19 is adapted to move toward or from the plate 16 but is held from angular movement therewith by means of said studs. I also provide a series of bolts 22 permanently and firmly connected at one end to the plate 16 and extending outwardly parallel to the studs 20 and 21 through the plate 19 and having on their outer ends adjustment nuts 23. Each of these bolts is surrounded by a cup 24, the bottom of which extends toward the bolt and constitutes a flange 25 and the outer end of which is formed into an outwardly extending flange 26 engaging over the plate 19. Each of the cups therefore constitutes a housing for a strong expansible coil spring 27 bearing at one end against said flange 25 and the other end bears against said nut 23. The normal tendency of the springs is to cause the plate 19 to be forced toward the plate 16 by virtue of the cups herein described. The force of the springs for the purpose just stated is determined or adapted to be modified by adjustment of the nuts 23 along the respective bolts 22, access being had to the nuts through a hole 28 in one wall of the casing but normally closed by means of a plug 29.

The desired friction whereby the driving connection is made between the fly wheel and the driving sleeve is created through a plurality of friction disks 30 and 31 arranged in alternation to one another between the plates 16 and 19. The disks 31 are provided with lugs or extensions 31' having positive engagement in notches 32 of the fly wheel 12ᵇ whereby the disks 31 will be caused to rotate positively with the fly wheel. The inner edges of said disks 31 which are in reality annular in form, are adapted to roll upon a series of antifriction members 33 journaled upon the studs 21, whereby the several parts which have relative rotations may be properly centered and supported in operation. The other friction disks 30 which are also annular are wider than the disks 31 and extend inwardly beyond the edges of the disks 31, and the pins and bolts above described pass therethrough, whereby said wider disks are caused positively to rotate with the plates 16 and 19. It follows, therefore, that under the normal tendency or force of the springs 27, the compression plate 19 acting through the intermediate disks 30 and 31 and upon the plate 16 will cause the fly wheel and the driving sleeve 13 to be locked together frictionally and with sufficient strength to drive a load within the scope of the power for which the device is designed or adjusted.

Any suitable means may be provided to relieve the force of the springs acting in the manner above described whereby freedom of movement between the several disk elements may be provided and allowing therefore the fly wheel to rotate freely around the driving sleeve. The means I show for this purpose includes a thrust sleeve 34 mounted upon the power sleeve 13 and having engagement with an anchor bushing 35 fixed in position in the casing hub 36 by means of a lock nut 37. The connection just described between the thrust sleeve 34 and said anchor bushing consists of a spiral thread 34', as shown best in Fig. 3. Secured to the outer end of said thrust sleeve in any desired angular position of adjustment is an arm 38 to the outer end of which is adapted to be connected a lever connection (not shown), but through which and the arm the thrust sleeve 34 is adapted to be rotated and hence caused, by means of the thread thereof, to be advanced longitudinally of the power sleeve 13. The other end of the thrust sleeve 34 is provided with an outwardly projecting flange 39 arranged parallel to and between the plates 16 and 19. The space between the flange 39 and compression plate 19 is approximately filled by means of antifriction thrust devices including a pair of plates or raceways 40 and 41 between which is arranged a case 42 carrying a series of rollers 43. It will follow therefore that when the thrust sleeve is forced outwardly along the power sleeve, the flange 39 thereof acting through the antifriction devices just described will force the compression plate outwardly or away from the plate 16, and since the outward movement of said plate 16 is prevented by the thrust bearings 18, it will be seen that the friction will be relieved between or among the friction disks 30 and 31 to the extent of such outward movement of the thrust sleeve 34. Such movement, however, increases the tension of the springs 27 which is always active to restore the frictional engagement between or among the several clutch members as soon as the thrust sleeve is returned to normal position.

Having thus described my invention, I claim as new and desire to secure by Letters Patent:—

1. In a device of the character set forth, the combination of a crank casing, a crank shaft journaled therein, the crank mechanism including a fly wheel within the casing, a power sleeve extending outwardly beyond the casing and having within the casing a plate arranged within said fly wheel, means coöperating with said plate to effect frictional engagement between the fly wheel and said plate, and means journaled upon the power sleeve and serving to control the force of said frictional engagement.

2. In a device of the character set forth, the combination of a substantially closed casing, a crank shaft journaled therein and including a fly wheel within the casing, one end of the shaft projecting beyond one side of the casing, a power sleeve journaled upon said shaft and projecting at one end from the casing and having at its other end a plate within the fly wheel, said fly wheel and plate being adapted for independent rotation, automatic means within the casing to make frictional driving connection between the fly wheel and the plate, said means including a compression plate arranged in spaced parallel relation to the power sleeve plate, and means serving to relieve the aforesaid friction, the latter means including a thrust sleeve journaled upon the power sleeve and having an outwardly projecting flange at its inner end between the compression plate and the first mentioned plate, and means on the outer end of said thrust sleeve to cause its flange to force the compression plate away from the first mentioned plate.

3. In a device of the character set forth, the combination of a substantially closed casing, a crank shaft journaled in the casing and extending at one end therefrom, said crank mechanism including a fly wheel within the casing, a power sleeve journaled upon the crank shaft and projecting at one end from the casing and having at its inner end a plate arranged within the fly wheel, thrust means secured to the outer end of the shaft and serving to prevent outward displacement thereon of the power sleeve, means within the casing to make automatic frictional connection between the fly wheel and said power sleeve plate, said means including a compression plate arranged in spaced parallel relation to the first mentioned plate and a series of springs acting between said plates to force them toward each other, and means controllable from the outside of the casing and extending between said plates for the purpose of forcing the compression plate away from the first mentioned plate while said first mentioned plate is held from longitudinal movement along the axis of the shaft by said thrust means.

4. In a device of the character set forth, the combination of crank mechanism including a fly wheel, a power sleeve having an integral plate at one end thereof within the fly wheel, a compression plate surrounding the sleeve and in spaced relation to said first mentioned plate, means to so connect said two plates as to cause them to rotate together around the axis of the sleeve but giving the compression plate freedom to move toward or from the other plate, said connecting means including a series of bolts secured at one end to the first mentioned plate, a cup surrounding each of said bolts, said cup having at one end an inwardly projecting flange adjacent the bolt and at the other end an outwardly projecting flange engaging over the compression plate, a spring within the cup bearing at one end against the inwardly projecting flange, and a nut adjustable along the bolt and bearing against the outer end of the spring.

5. In a device of the character set forth, the combination of a casing, crank shaft mechanism journaled within the casing and having one end thereof projecting beyond the casing, said crank mechanism including a fly wheel within the casing, a driving member on the outside of the casing, means to connect said fly wheel to said driving member, said connecting means including a power sleeve journaled upon the projecting end of the shaft and having on its inner end a plate, a series of friction disks within the casing, means to automatically cause the friction disks to normally make frictional driving connection between the fly wheel and said plate, a thrust sleeve surrounding the power sleeve and having at its inner end an outwardly projecting flange parallel to the aforesaid plate, an anchor bushing surrounding the thrust sleeve and fixed to the casing, and means to cause outward adjustment of the thrust sleeve with respect to the anchor bushing and thereby cause the thrust sleeve flange to relieve the aforesaid friction, substantially as set forth.

In testimony whereof I have signed my name to this specification in the presence of two subscribing witnesses.

OTTO G. DE WALD.

Witnesses:
GEO. L. BEELER,
PHILIP D. ROLLHAUS.